Dec. 1, 1959   D. F. MOORE   2,915,632
CIRCUITS FOR COUNTING ELECTRICAL PULSES
Filed Oct. 19, 1956
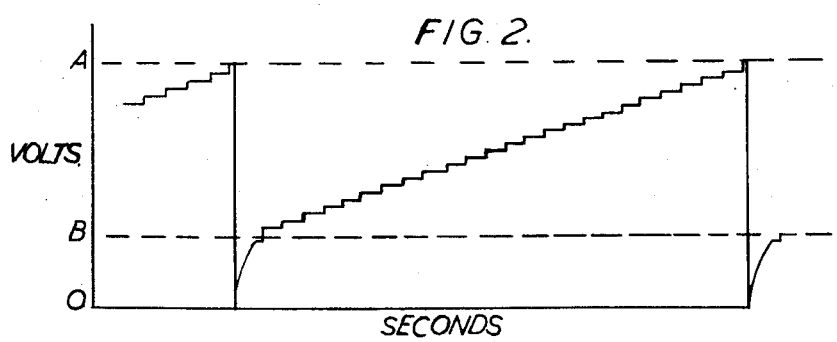
Inventor
DONALD F. MOORE
By
Watson, Cole, Grindle + Watson
Attorneys United States Patent Office 2,915,632
Patented Dec. 1, 1959

2,915,632

CIRCUITS FOR COUNTING ELECTRICAL PULSES

Donald Fergus Moore, Cardiff, Wales

Application October 19, 1956, Serial No. 617,092

Claims priority, application Great Britain October 19, 1955

4 Claims. (Cl. 250—27)

This invention relates to circuits for counting electrical pulses and its general object is to provide a simple circuit with a count-down of a high and accurately determined power.

The invention more particularly relates to circuits of the kind comprising an integrating capacitor (alternatively called a tank or storage capacitor) which is adapted to be fed with electrical pulses all of the same kind whereby the charge on the integrating capacitor is brought to a predetermined level, switch means arranged to bring about a variation of the charge on the capacitor by a predetermined amount on the attainment of said charge level, and counting means operative once in every cycle of the integrating capacitor.

In a circuit of this kind the charge variation occurs rapidly in relation to the maximum pulse rate to be expected, such that the number of pulses received during such charge variation is zero or negligible. The charge variation corresponds to a fixed number of pulses and the switch means acts only when the integrating capacitor has received this number since the previous count, so that each count represents the fixed number.

A diode pump may provide the integrating capacitor and the means for feeding the pulses to it; a diode pump is understood herein to comprise essentially a feed capacitor connected to a pair of diodes or their electrical equivalents such that the cathode of one diode and the anode of the other are respectively connected to one side of the feed capacitor, the other electrodes of the two diodes being connected one (directly or otherwise) to earth and the other also to earth through the integrating capacitor, whereby charges applied to the feed capacitor are applied successively to the integrating capacitor: the sign of the charge applied to the integrating capacitor depends on which of the diodes is connected thereto.

Various circuits of the kind just described have been proposed and in these prior circuits it has been common to bring about said variation of charge on the integrating capacitor by connecting it to a fixed-potential source; for example the integrating capacitor may be charged positively and at a predetermined charge level connected to earth. Now for reliable counting the fixed-potential source must be of low impedance and its voltage must not fluctuate when the charge variation occurs: this has led to the requirement of bulky and complicated power supply circuits which are preferably to be avoided on grounds of convenience and economy. Further difficulty has been experienced in the past in connection with the switch means, due for example to charge leakage or short tube life on account of the heavy currents passing on said charge variation at the integrating capacitor.

The primary object of the present invention is to provide a circuit capable of reliable operation without an elaborate power supply circuit and which at the same time obviates the disadvantages common among the switch means of the prior art.

In the counting circuit according to the invention, a capacitor is provided to which the integrating capacitor, for said variation of charge thereof, is connected by the switch means on attainment of the predetermined charge level, the switch means comprises a relay having an actuating coil connected to the output of a trigger device, the relay in one condition connecting the charge-varying capacitor such as to maintain it at a predetermined charge level (different from that of the integrating capacitor which causes operation of the switch means) the relay in its other condition connecting the integrating capacitor to the charge-varying capacitor for charge-sharing between said capacitors, and the trigger device is connected to the integrating capacitor (in a manner to prevent charge leakage thereof) whereby in one stable state of the trigger device the relay is in said one condition but on the attainment by the integrating capacitor of said predetermined charge level the trigger device triggers to its other stable state in which it brings the relay to its other condition.

Preferably the relay in said one condition connects the terminals of the charge-varying capacitor whereby to fully discharge it, the circuit being such that charges are fed to the integrating capacitor to charge it positively: in this arrangement the charge-varying capacitor forms a "sink."

The invention will be further described with reference to a preferred counting circuit illustrated in the accompanying drawing in which Figure 1 is a circuit diagram and Figure 2 a graph of potential against time for a point in the circuit.

Referring to Figure 1, a pulse generator 1 is arranged to supply pulses of uniform square wave form to a diode pump comprising a feed capacitor 2, a pair of diodes 3, 4 and an integrating capacitor 5. The pulse generator can be of any type in which the voltage excursion of the output pulse is related to predetermined voltages applied to it, as with the phantastron type of pulse generator; the predetermined voltages in the present case are supplied by the H.T. line and a reference voltage the source of which is indicated at 6 and may be a simple bleed resistor chain between the H.T. lines.

A hard valve 7 is arranged conventionally as a cathode follower with resistors 27, 28 connected between its anode and cathode respectively and the corresponding H.T. line: the control grid 8 of valve 7 is connected to the positive side of the integrating capacitor 5. The cathode 9 of the valve 7 is connected to one fixed contact 11 of a relay designated generally 12. The other fixed contact 13 of the relay 12 is connected to the negative H.T. line through a resistor 14 and the armature contact 15 of the relay is connected to this line through a sink capacitor 16. The relay 12 has an actuating coil 17 fed from the output of a trigger device 18 which is such that in the first of its stable states the relay coil 17 is unenergized and the armature contact 15 lies against the fixed contact 13 while in the second stable state of the device 18 the coil 17 is energized and the armature contact lies against the fixed contact 11.

A second hard valve 20 is connected with anode and cathode load resistors 21, 22 respectively between the H.T. lines, and its grid 23 is connected to the reference potential source 6. The cathode 24 of the valve 20 is connected to the cathode 9 of the valve 7 through a diode 25, and the anode 26 of the valve 20 is connected to the trigger device 18.

The circuit functions as follows: The trigger device 18 is arranged (as will appear in the following paragraph) to trigger from its first to its second stable state when the integrating capacitor 5 reaches its predetermined maximum charge level. When the voltage of the capacitor 5 is less than its maximum the relay coil 17 is unenergized and the sink capacitor 16 is short-circuited through the resistor 14. When the voltage of the capacitor 5 reaches its maximum the trigger device 18 triggers, the relay coil 17 is energized, and the sink capacitor 16 is connected to the cathode 9 of the valve 7 thus instantaneously the cathode 9 is earthed and grid 8 is at a positive potential. Hence grid current flows tending to reduce the grid voltage to earth potential, but is met on its downward trend by the rising voltage on cathode 9, due to the capacitor 16 charging to a positive voltage via the anode circuit of valve 7. The rate of charge of capacitor 16 is controlled by the time constant of the valve resistance of valve 7 and resistor 27, and capacitor 16. Capacitor 5 discharges more or less at a constant rate via the grid current leakage path of valve 7. Hence the voltage drop of capacitor 5 is controlled mainly by the charging elements of capacitor 16 as above. Equilibrium exists when grid current ceases which occurs when a small negative bias exists. For all practical purposes the integrating and sink capacitors are then at the same potential. Initial conditions are then restored and the sink capacitor 16 is discharged through the resistor 14 when the relay returns to the position illustrated.

As charge builds up on the integrating capacitor 5 the voltage of the cathode 9 of the valve 7 increases. The voltage at the cathode 24 of the valve 20 will be the reference voltage applied to the grid 23, and no current will flow through the diode 25 until the voltage of the cathode 9 reaches the reference voltage. After this current will pass, the voltage at the cathode 24 will increase, thereby negatively biassing the valve 20, and the voltage at the anode 26 will accordingly rise until the firing point of the trigger device 18 is reached.

Figure 2 illustrates the potential changes at the cathode 9 during one cycle of operation of the circuit.

Operation of the relay is caused to effect a count by means of a second relay (not shown), mechanically connected to the first.

The counting circuit of the invention is particularly suited for counting the revolutions of the rotor of the flow meter sensing unit subject of our copending application for Letters Patent of the U.S.A. Serial No. 604,200, filed August 15, 1956. The output of the sensing coils of such unit is amplified and fed through a D.C. coupling (suitably a pea neon tube) to control the output frequency of the pulse generator 1.

As will be appreciated from the foregoing the larger the capacity of the sink capacitor 16 in relation to the capacity of the integrating capacitor 5, the greater the discharge current and the greater the potential drop across the integrating capacitor on discharge. By suitable choice of capacitor values this drop can be made up to two-thirds of the maximum voltage across the integrating capacitor. The drop can be made even larger, but at the expense of a longer time required for the discharge. For 100% accuracy in count this time should be zero, but the time in question is small and unless the frequency of the pulse generator output is excessive it can be disregarded if 1% inaccuracy of count is tolerable.

The counting circuit described has the following characterics and advantages:

(1) Leakage across the integrating capacitor is reduced to a minimum as access to it is obtained only through the cathode follower valve 7 the input impedance of which is large.

(2) The discharge path is robust and not easily damaged by the discharge current.

(3) No complicated "sink" is necessary.

(4) The voltage excursion of the integrating capacitor is controlled firstly by the reference potential and secondly by the sink capacitor.

(5) The reference potential is applied to both the pulse generator and the valve 20, which determines the firing point of the trigger device 18. Should this potential increase a corresponding increase in pulse amplitude will occur in the output from the pulse generator. The rate of charge of the storage condenser will therefore increase and tend to cause a faster count than the correct one. However in the valve 20 the reference potential will raise the point A (see Figure 2) and to a lesser extent point B, and thus tend to cause a slower count than the correct one. These two tendencies are opposite and in this way the count can be made to some extent independent of changes in reference potential.

I claim:

1. A frequency divider circuit to receive electrical pulses all of the same magnitude and sign and to count out one for a predetermined number of input pulses comprising an integrating capacitor; means to feed said pulses successively thereto to change the charge thereon stepwise from a first to a second fixed limit potential, the difference between said limit potentials determining the number of pulses per count for a given pulse magnitude; a trigger device having first and second stable states and comprising an input the potential at which determines the state of the device and an output, the integrating capacitor being connected to said input and the trigger device being in the first stable state until attainment by the integrating capacitor of the second limit potential and thereupon assuming the second state until the integrating capacitor returns to its first limit potential; a relay having an actuating coil connected to the trigger device output and being constructed to assume either a first or a second operating condition in correspondence with the state of the trigger device; and a charge-varying capacitor, the relay acting in the second condition thereof to connect the integrating and charge-varying capacitors for charge-sharing between them whereby to return the integrating capacitor from its second to its first limit potential and in its first condition to connect the charge-varying capacitor whereby to maintain it at predetermined constant potential.

2. A counting circuit as claimed in claim 1 wherein the relay in said first condition thereof connects the charge-varying capacitor to fully discharge it.

3. A counting circuit as claimed in claim 1 further comprising a cathode follower having its grid connected to the integrating capacitor and its cathode connected to the trigger device, the cathode follower substantially preventing leakage of charge from the integrating capacitor and forming part of the charge-sharing path between the integrating and charge-varying capacitor.

4. A frequency divider circuit to receive electrical pulses and to count out one for a predetermined fixed number of input pulses; including a reference fixed-potential source; a pulse generator having an input to receive the said pulses and a connection to the reference source, the generator supplying output pulses of uniform magnitude dependent on the reference potential and at the frequency of the input pulses; a diode pump including an integrating capacitor and means connected to the pulse generator to receive the output pulses thereof and feed said pulses successively to the integrating capacitor to charge it stepwise from a first to a second fixed limit potential; a cathode follower having its control input connected to the integrating capacitor; an electronic device having a pair of terminals for passing unidirectional current through the device and a control input the potential at which determines said current, said control input and one said terminal being connected to the cathode follower output and refence potential source whereby the current in said device undergoes an abrupt change after receipt by the integrating capacitor of the predetermined number of output pulses from the generator substantially independently of small variations of reference potential by reason of change of potential influencing both the output pulse magnitude and the bias said electron tube; a sink capacitor; switching means responsive to anode current in said vacuum tube to interconnect the sink and integrating capacitors momentarily upon said abrupt change of anode current to cause charge-sharing between said capacitors and thereby return of the integrating capacitor to the first limit potential, the switching means maintaining a predetermined constant charge level on the sink capacitor between the occasions of its connection to the integrating capacitor.

References Cited in the file of this patent

UNITED STATES PATENTS

| | | | |
|---|---|---|---|
| 2,342,753 | Pearson | Feb. 29, | 1944 |
| 2,489,824 | Shenk | Nov. 29, | 1949 |
| 2,617,024 | Hart | Nov. 4, | 1952 |
| 2,619,618 | Adler | Nov. 25, | 1952 |
| 2,699,504 | Miller | Jan. 11, | 1955 |
| 2,831,111 | Bivens | Apr. 15, | 1958 |
| 2,832,887 | Kirschner | Apr. 29, | 1958 |